United States Patent
Bottinelli et al.

(10) Patent No.: US 6,453,566 B1
(45) Date of Patent: Sep. 24, 2002

(54) MOVEMENT TRANSMISSION UNIT AND MOVEMENT TRANSMISSION APPARATUS EMPLOYING THE SAME

(75) Inventors: Stefano Bottinelli, S. Pietro (CH); Simon Henein, Lausanne (CH); Cedric Aymon, Ayent (CH); Reymond Clavel, Le Borget (CH)

(73) Assignee: Agie SA (CH)

( * ) Notice: Subject to any disclaimer, the term of this patent is extended or adjusted under 35 U.S.C. 154(b) by 0 days.

(21) Appl. No.: 09/747,906

(22) Filed: Dec. 22, 2000

(30) Foreign Application Priority Data

Dec. 22, 1999 (DE) .......................................... 199 62 247

(51) Int. Cl.$^7$ .................................................. G01B 5/00

(52) U.S. Cl. ............................. 33/1 M; 33/503; 33/520; 33/572; 33/573

(58) Field of Search ........................ 33/1 M, 503, 520, 33/556, 558, 559, 561, 573, 572

(56) References Cited

U.S. PATENT DOCUMENTS

| | | |
|---|---|---|
| 2,286,571 A | 6/1942 | Pollard |
| 4,523,383 A | 6/1985 | Rogers et al. |
| 4,559,717 A * | 12/1985 | Scire et al. .................. 33/1 M |

(List continued on next page.)

FOREIGN PATENT DOCUMENTS

| | | |
|---|---|---|
| CH | 672 089 A5 | 12/1985 |
| DE | 37 21 682 A1 | 4/1988 |
| DE | 199 20 776 A1 | 11/1999 |
| EP | 0 264 147 B1 | 12/1994 |
| EP | 0 368 268 B1 | 1/1995 |
| EP | 0 937 961 A2 | 8/1999 |

OTHER PUBLICATIONS

Henein et al., "Fatigue failure of thin wire–electrodischarge machined flexible hinges" Procedures of SPIE Symposium on Intelligent Systems for Advanced Manufacturing Boston, MA Sep. 19–22, 1999.

(List continued on next page.)

*Primary Examiner*—Diego Gutierrez
*Assistant Examiner*—Yavitza Guadalupe
(74) *Attorney, Agent, or Firm*—Marshall, Gerstein & Borun

(57) ABSTRACT

The invention concerns a movement transmission unit and a movement transmission apparatus employing the same. The movement transmission transmits at least two movement components, each possessing one degree of freedom of movement, from an input-side (6) to an output-side (82, 84), which movement then has at least two coupled degrees of freedom of movement, or vice versa. The invention also concerns one transmission unit (2) per input-side (6) degree of freedom of movement, i.e multiple transmission units (2), which are functionally bound together in parallel by means of their respective output sections (8). Each transmission unit (2) possesses an immobile, solidly fixed first section (4). Its input facility is a second section (6), which is bend linked to the fixed first section (4) by means of a unified linkage structure encompassing parts (22, 26, 34; 28, 36) and forming what becomes known as a first "parallelogram linkage". This is movably linked in the direction of the corresponding degrees of freedom of movement of the transmission unit (2). The second section (6) is so designed, that by means of a second linkage structure, (46, 50, 58, 48, 52, 60), i.e. another "parallelogram linkage", second section 6 allows output-side, free movement along the degree of freedom of movement of the other transmission units (2). For the increase of the movement precision of such a movement transmission apparatus, the first (22, 26, 34; 24, 28, 36) and/or the second (46, 50, 58; 48, 52, 60) linkage structures are designed as bend linkages. Further, the second section (6), the second linkage, (50; 52; 58; 60) and the output-side (8) are so designed, that the associated transmission unit (2) forms a rigid structure.

29 Claims, 7 Drawing Sheets

U.S. PATENT DOCUMENTS

| | | | |
|---|---|---|---|
| 4,578,873 A | * 4/1986 | Klingler et al. | 33/556 |
| 4,637,777 A | 1/1987 | Smulders et al. | |
| 4,667,415 A | * 5/1987 | Barsky | 33/1 M |
| 4,686,440 A | * 8/1987 | Hatamura et al. | 250/442.11 |
| 4,888,878 A | 12/1989 | Nagasawa et al. | |
| 4,976,582 A | 12/1990 | Clavel | |
| 4,991,309 A | * 2/1991 | Nagasawa et al. | 33/573 |
| 5,029,398 A | 7/1991 | Ertl | |
| 5,160,877 A | 11/1992 | Fujiwara et al. | |
| 5,699,621 A | * 12/1997 | Trumper et al. | 33/573 |
| 5,797,191 A | * 8/1998 | Ziegert | 33/503 |
| 6,193,226 B1 | 2/2001 | Davies | |
| 6,336,375 B1 | * 1/2002 | McMutry et al. | 33/503 |

OTHER PUBLICATIONS

Henmi, A Six–Degrees of Freedom Fine Motion Mechanism, International Progress in Precision Engineering 1993.

Henmi et al., A Six–Degrees of Freedom Fine Motion Mechanism, Mechatronics vol. 2, No. 5. pp. 445–457, 1992.

* cited by examiner

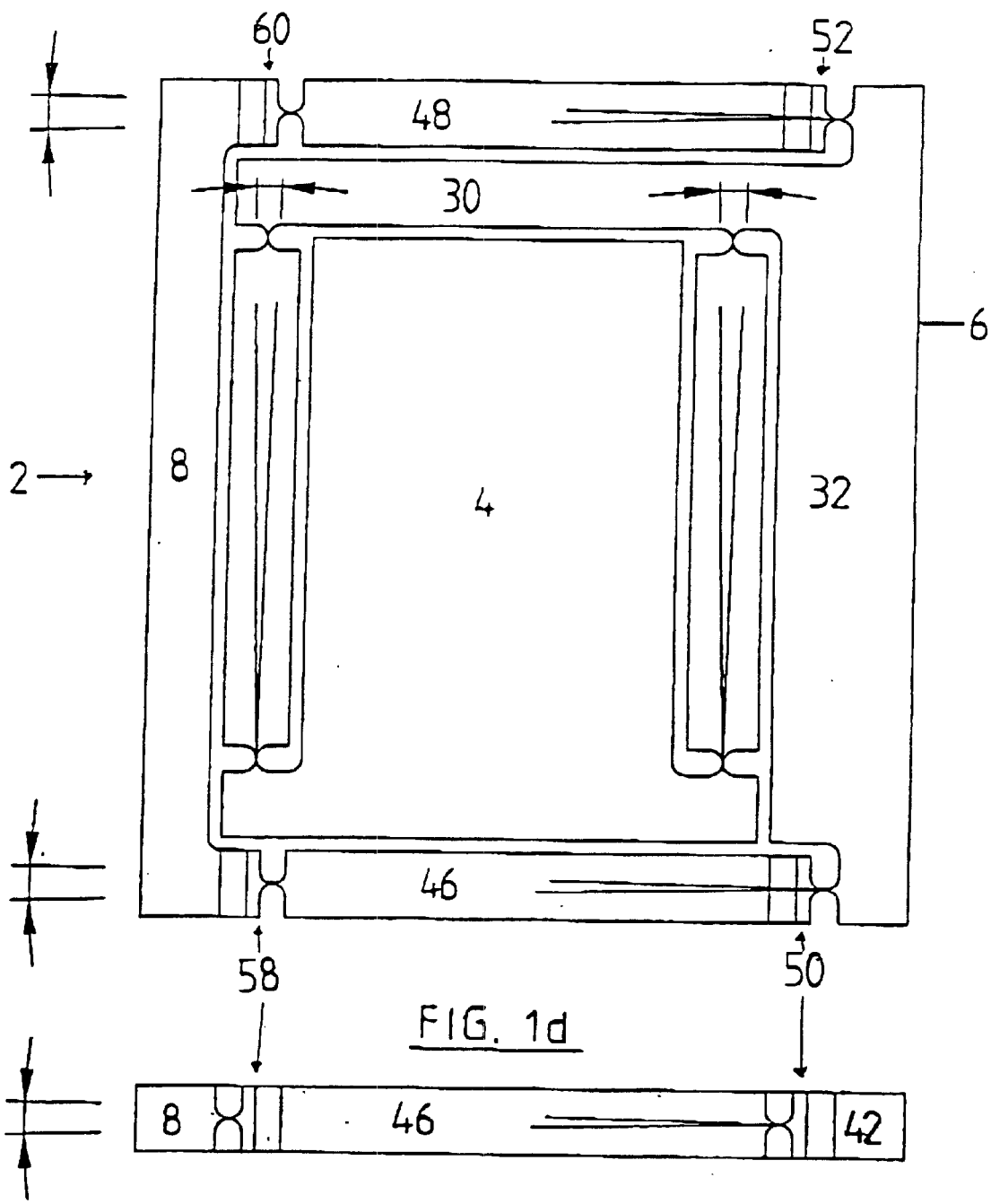

A-A

B-B

MOVEMENT TRANSMISSION UNIT AND MOVEMENT TRANSMISSION APPARATUS EMPLOYING THE SAME

RELATED APPLICATIONS

This application claims priority from German Patent Application No. DE 199 62 247, filed Dec. 22, 1999.

FIELD OF THE INVENTION

The present invention relates generally to a movement transmission apparatus. More specifically, the present invention relates to a movement transmission apparatus for the transmission of at least two input-side movement components, each movement component having one degree of freedom, into one output-side movement with at least two degrees of freedom, or vice versa. Further, the present invention relates to a positioning apparatus formed from a number of individual transmission units that have been functionally coupled with one another in parallel arrangement by means of their respective output sections.

BACKGROUND OF THE INVENTION

The first mentioned movement transmission apparatus was disclosed by the CH-patent 672089, which described a positioning apparatus with such a movement transmission apparatus. This movement transmission apparatus exhibits three functionally parallel transmission units, which, together permitted a positioning of an output part of the positioning apparatus in three degrees of freedom of movement. This positioning apparatus encompasses per transmission unit a firm base with an actuator, which drives the one movable section of the movement transmission apparatus. The movable section, in turn, exhibits on its own account, two universal jointings and by means of these, is bound to the movable part of the movement transmission apparatus. The actuator swings each transmission unit on its associated, movable section about a corresponding, rotatable axle. The two universal joints of the movable sections are bonded to one another by a rod, permit a movement of each transmission unit in the direction of the swinging movement of the other two transmission units. The combined effect is that the movable output part of this movement transmission apparatus carries out a movement in space, in which the inclination and orientation of this output part remains undisturbed, while the three transmission units continue to be driven. On the bases of this formulation, with swinging axles and universal joints, this movement transmission apparatus does adapt itself, but only conditionally, for precision operations, since these universal linkages can be constructed only with the expenditure of considerable technical effort for the required minimum of movement play.

The second named generic movement transmission apparatus is, for instance, taught by the DE 37 21 682 A1. This publication shows in one embodiment, a movement transmission apparatus with three transmission units, which, on the input-side, respectively, are caused to undergo a linear or plane movement which runs at an angle to the extending direction of the respective transmission unit. The transmission units are comprised of respectively one carrying arm, which, by means of its own solid body swing joint, for instance, a film hinge, is coupled with the input and the output section of the respective transmission unit. The three transmission units are coupled with one another by means of their output sections. With the special formulation of the transmission units, especially the solid body linkage, there arise nevertheless, displacement movements in the micrometer range, which are not sufficiently precisely adjustable and exhibit too much play, i.e. are too loose.

EP 0 937 961 A2 brings into public knowledge a mechanism for a multi-axle positioning apparatus, which possesses a stationary and a movable section, which are bound together, per axle, by a transmission apparatus to carry the force onto the movable section. The transmission units possess two parallel rods of flexible material, which, per rod, respectively encompasses two bendable sections. In this matter, the said rods are composed of hollow tubing, which are interrupted at the bend sections, at which place, a length of piano wire is inserted. The transmission units transmit the force along their extending axes onto the movable part and permit a free movement perpendicular to its extended direction, that is to say, along the axles of the other transmission units.

The U.S. Pat. No. 4,888,878 makes known a positioning apparatus with a movement transmission apparatus, which has the capability of controlling three or more degrees of freedom of movement. In this arrangement, the movement transmission apparatus possesses several functional, in-series connected, transmission units, wherein each, in output to input fashion, is coupled with the next. That transmission unit which lies first in the sequence, possesses an immovable anchor base, and the final transmission unit in the line is coupled to the controlling output element of the movement transmission apparatus. Each transmission unit exhibits a driving means, that drives a movable second section relative to a "solid" section. The movable second section is connected with the said "solid" section by means of a flexible bend linkage. The disadvantage of this movement transmission apparatus lies therein, in that because of its serial build-up, each transmission unit is burdened with the increasing weight of the sequential transmission units, whereby, the dynamics are disadvantaged by sequentially compounding characteristics.

Thus, there is a continuing need to further improve, in depth, the movement transmission apparatuses of the generic type in their functional parallel kinematics to the end that precision movements are made possible.

SUMMARY OF THE INVENTION

A transmission unit assembled in accordance with the teachings of the present invention encompasses a first section and a second, input section linked to the first section by means of a first bend linkage. The first section is movably linked in the direction of the corresponding degree of freedom of movement of the transmission unit. In this system, the second section is so designed, that, by means of a second, output-side bend linkage, the section allows free travel within the degree of freedom of movement.

Further, a movement transmission assembled in accordance with the teachings of the present invention permits the transmission of three input-side movement components with respectively one degree of freedom of movement into an output-side movement with three movement degrees of freedom, or vice versa. Three transmission units, each including one input section and one output section, may be functionally coupled with one another by means of their output sections, with each transmission unit exhibiting an extended direction from its current input section to its respective output section. As a hingedly designed means of linkage, the output section of each transmission unit permits free movements perpendicular to its extension direction, whereby, the input section of the transmission unit is so formulated, that the respective input-side movement is introduced at an angle to the direction of extension.

According to a first aspect of the invention, in a generic type of a first movement transmission apparatus, the first and the second jointing means are designed as bend linkages, and the second section, the second bend linkage means and the output section are so constructed, that in combination they form a rigid structure along the degree of freedom of movement of the input-side of the thereto associated transmission unit.

According to another aspect of the invention, in a second movement transmission apparatus of the generic type, the bend linkages are designed according to the kind of parallelogram-swing linkages, wherein each parallelogram-swing linkage encompasses one bar pair with respectively one bend linkage on all four bar ends. Further in this arrangement, the two respective ends of one bar, by means of the corresponding bend linkage, are respectively coupled with the input section and with the output section. By this arrangement, the rigidity of a transmission unit, and therewith the precision of the entire movement transmission apparatus is advantageously increased. With advantage, the output movement has, in the stated arrangement, a movement component along one of the three degrees of freedom of movement, the travel path of which is greater, when compared to the travel path of the movement component of the two other degrees of freedom.

Certain advantages and features of the disclosed embodiment are described in more detail below, with reference being made to the accompanying drawings.

BRIEF DESCRIPTION OF THE DRAWINGS

FIG. 1c is a top plan view similar to FIG. 1a and illustrating the swinging movement of the transmission unit;

FIG. 1d is a side view similar to FIG. 1b and illustrating additional swinging movements of the transmission unit;

FIG. 2c is an enlarged fragmentary top plan view taken about the circumscribed portion of FIG. 2 and illustrating a double bend linkage;

DETAILED DESCRIPTION OF THE PREFERRED EMBODIMENT

The following description of the preferred embodiments is not intended to limit the scope of the invention to the precise forms disclosed, but instead is intended to be illustrative of the principles of the invention so that others skilled in the art may follow its teachings.

In the following figures, to the extent possible the same reference numbers will apply to the same or similar components.

Figure 1A:
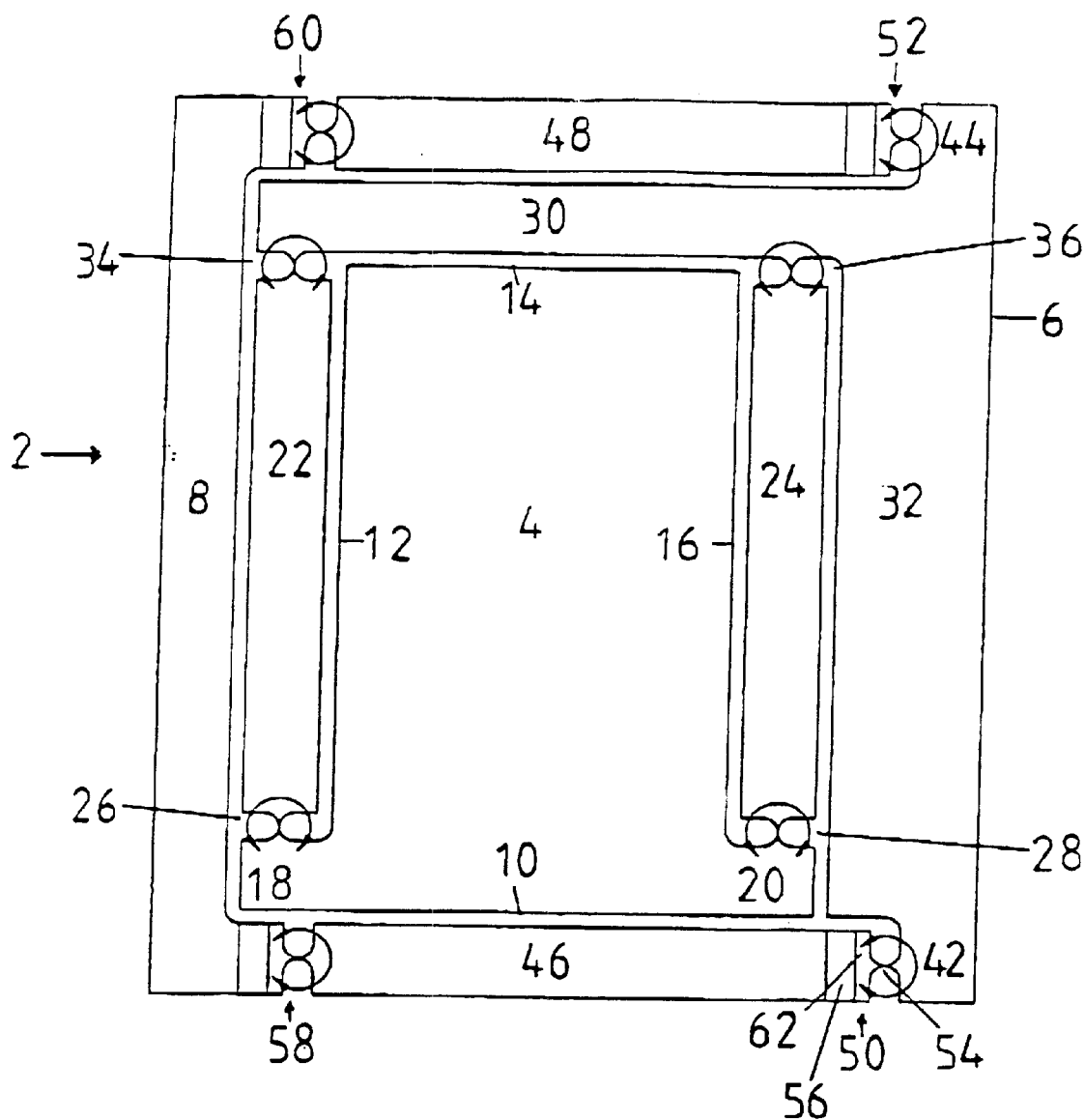
FIG. 1a is a top plan view of a transmission unit assembled in accordance with the teachings of a first embodiment of the present invention, which transmission unit is for use in a movement transmission apparatus of the present invention.
Figure 1B:
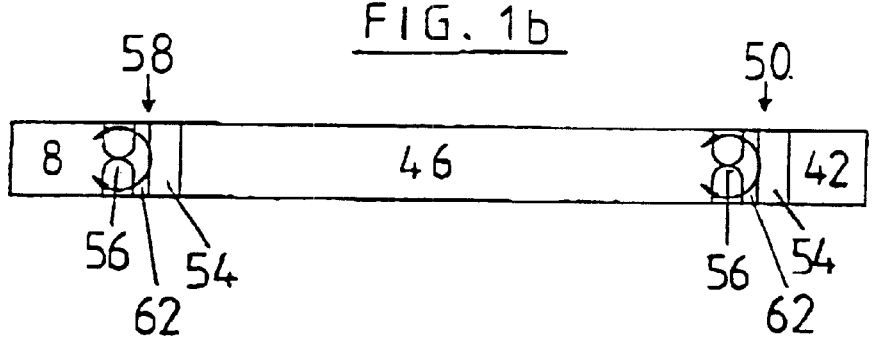
FIG. 1b is a side view thereof.

Referring now to FIGS. 1a and 1b of the drawings, a top plan view and a side view illustrate a transmission unit 2 assembled in accordance with the teachings of a first preferred embodiment of the present invention. Similarly, FIGS. 1c and 1d show the same embodiment as FIGS. 1a and 1b, except that in FIGS. 1c and 1d the swinging movements of the transmission unit 2 are illustrated. The transmission unit 2 is comprised of a first section 4, a second section 6 and an output section 8. The first section 4 is constructed as a rectangular plate with four side surfaces, namely, sides 10, 12, 14 and 16. The oppositely disposed side surfaces 12 and 16 each have a projection 18 and 20 adjacent their corner zones of the side surface 10. As an alternative, the first section 4 can also be constructed as no more than a bar, with the two ends of the bar forming the projections 18 and 20. The shown plate shaped form is preferable for the structural advantages thereof and because of the fact that the first section 4 may act as an immovable base for the first movement transmission apparatus (discussed below), and thus plays no part where the movable weights of each transmission unit 2 are concerned. Instead of the bar shaped designed first section 4, this can also be fashioned, in a third alternative, as in the form of two, separately present projections 18 and 20, which individually can be secured on an immovable base of the first movement transmission apparatus.

A pair of bars 22 and 24 extend adjacent the side surface 12 and 16, respectively, of the first section 4. The bar 22 extends adjacent to the side surface 12, while the bar 24 similarly extends adjacent to the side surface 16. The bars 22 and 24 are coupled by means of the respective bend linkages 26 and 28 to the corresponding projections 18 and 20. The bend linkages 26 and 28 allow the bars 22 and 24, respectively, a swinging movement from right to left in the embodiment depicted in FIG. 1a.

The second section 6 includes a first leg section 30 and a second leg section 32. The first and second leg sections 30, 32 are coupled together in the shape of a right angle. The angular shaped second section 6 is placed in relation to the first section 4 as shown in FIGS. 1a and 1c such that the first section 4 and the bars 22, 24 lie within the area partially bounded by the first and second leg sections 30, 32.

On the inner side of the first leg section 30, which inner side is adjacent to the empty area, the bars 22 and 24 are coupled to the first leg section 30 by means of additional bend linkages 34, 36. In other words, the front side of the bar 22, by means of the bend linkage 34 in the front side of the first leg section 30 is coupled with the inner side of the first leg section 30. Thus, the bar 22 is situated at right angles to the first leg section 30. The bar 24 is, by means of its front side and the bend linkage 36 coupled with the inner side of first leg section 30. Also, the bar 22 is perpendicular to the first leg section 30.

These form, based on the projections 18 and 20, the two bars 22 and 24, the four bend linkages 18, 20, 34 and 36, a parallelogram bend linkage, which in embodiment depicted in FIG. 1a is swingable from left to right in the manner shown in FIG. 1c. With the first section 4 held firm, the two bars 22, 24 swing respectively about their own bend linkages 26, 28 in pendulum like movement, while the first leg section 30 carries out a translation-movement from left to right and vice versa (see FIGS. 1a and 1c). Due to the design of this parallelogram-linkage, the translation-movement from right to left is an enforced-coupling, superimposed, translation movement of the second section 6 from above to below and vice versa. This, possibly undesirable superimposed translation movement can, by a corresponding combination of several transmission units 2, possibly be compensated for (see below for more).

A second leg section 32 of the second section 6 possesses on its two ends respectively a one piece, connected projection 42 and 44. On these projections 42, 44, are respectively a bar 46 and 48, which are linked by a corresponding double linkage 50, 52. The bar 46 runs, in this situation, oppositely to side surface 10 of the first section 4, while the bar 48 runs oppositely to outside of a first leg section 30 of the second section 6. Considered together, thus the two bars 22 and 24 enclose the first section 4 between them, while the two bars 46 and 48, along with the first leg section 30, bound the first section 4 in the transverse direction. Further, the two bars 46 and 48 are, as stated, orthogonal to the two bars 22 and 24.

The double linkage 50, as seen in the embodiment of FIG. 1a, d, is composed of a first (single) linkage 54 and a second (single) linkage (56) which are arranged orthogonally to one another. The first bend linkage 54 permits the bar 46 and 48 a swinging movement as is shown in the embodiment of FIG. 1a, from above to below and vice versa. The second bend 56 of the double linkage 50 and 52, enables the bars 46 and 48 a swing movement—of the embodiment shown in FIG. 1a—outside the plane of the drawing (also refer to FIGS. 1b, 1d).

The bars 46 and 48 are, with their two other ends, respectively coupled with a double bend linkage 58 and 60 to the output section 8. Further, the double linkages 58 and 60, respectively in the forward area of the output section 8, are coupled onto a longitudinal side of said output section 8. Thus, the bars 46 and 48 stand perpendicular to this longitudinal side of the output-side 8. Both double bend linkages 58 and 60, are built up from a combination of the first (single) linkage 54 and the second (single) linkage 56.

There is in each of the double bend linkages 50, 52, 58 and 60 a first bend linkage 54 made serially functional in a coupling with a second bend linkage 56, which is accomplished by a load apportioning section 62. The load apportioning section 62, in this action, is a bar shaped section, shortened in its length, the cross-section of which is made to correspond with that of the bar 46 (the cross-section can be of optional shape, particularly it must suit the forces of said loadings). It length should at least be so long, that no notch loadings occur at the transition zone to the two bend linkages. On the other hand, it should be short enough, that the two linkages lie as close as possible to one another.

The double linkages, 50, 52, 58 and 60 are, in their longitudinal direction so dimensioned, that they correspond to the breadth of the bars 22 or 24. The double linkage 58, 60 is further so placed, that the end of the first bend linkage 54 proximal to the bars 46, 48, aligns with the outside of the bar 22 which is proximal to side surface 12 of the first section 4, while the end of the second bend linkage 56 proximal to the output section 8 aligns with the outside of the bar 22 which is proximal to the output section 8.

The bend linkages 34 and 36 are, on the other hand, so placed, that their centers (that is their thinnest web) aligns with the side surface 14 of the first section 4. The double linkages 50 and 52 are placed such that the ends of the second bend linkages 56 (which ends are proximal to the two bars 46, 48) align with the outer side of the second leg section 32 of the second section 6, the outer side of which is proximal to the bar 24.

The second leg section 32 of the second section 6, the output section 8 and the two bars 46 and 48 form thus, a second parallelogram swinging element, which makes possible for the output section 8, as seen in the embodiment shown in FIG. 1a, a swinging action both upward to downward and vice versa, i.e. out of the plane of the drawing. Once again, these two movements, which are translational in nature and orthogonally directed to one another, are overridden by respective, orthogonally directed, translational movements by required coupling. In the case of a "translational" movement of the output section 8 from above to below, an override is made by a "translational" movement from left to right, and in the case of a "translational" movement of the output section 8 out of the plane of the drawing, likewise, an override is made by a "translational" movement from right to left.

Figure 2:
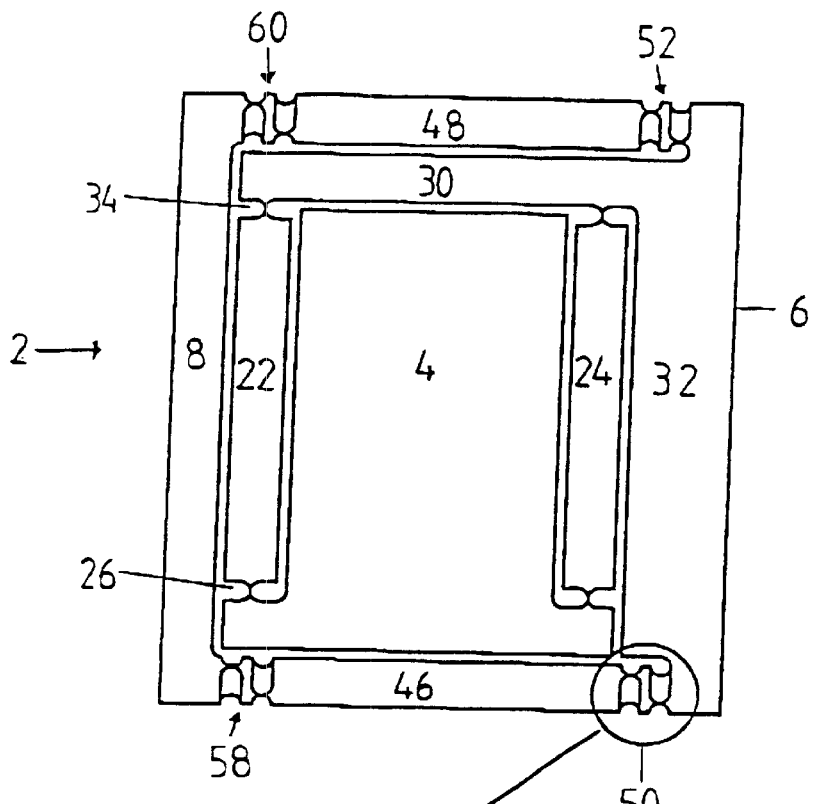
FIG. 2 is a top plan view of a transmission unit assembled in accordance with the teachings of a second embodiment of the present invention.
Figure 4:
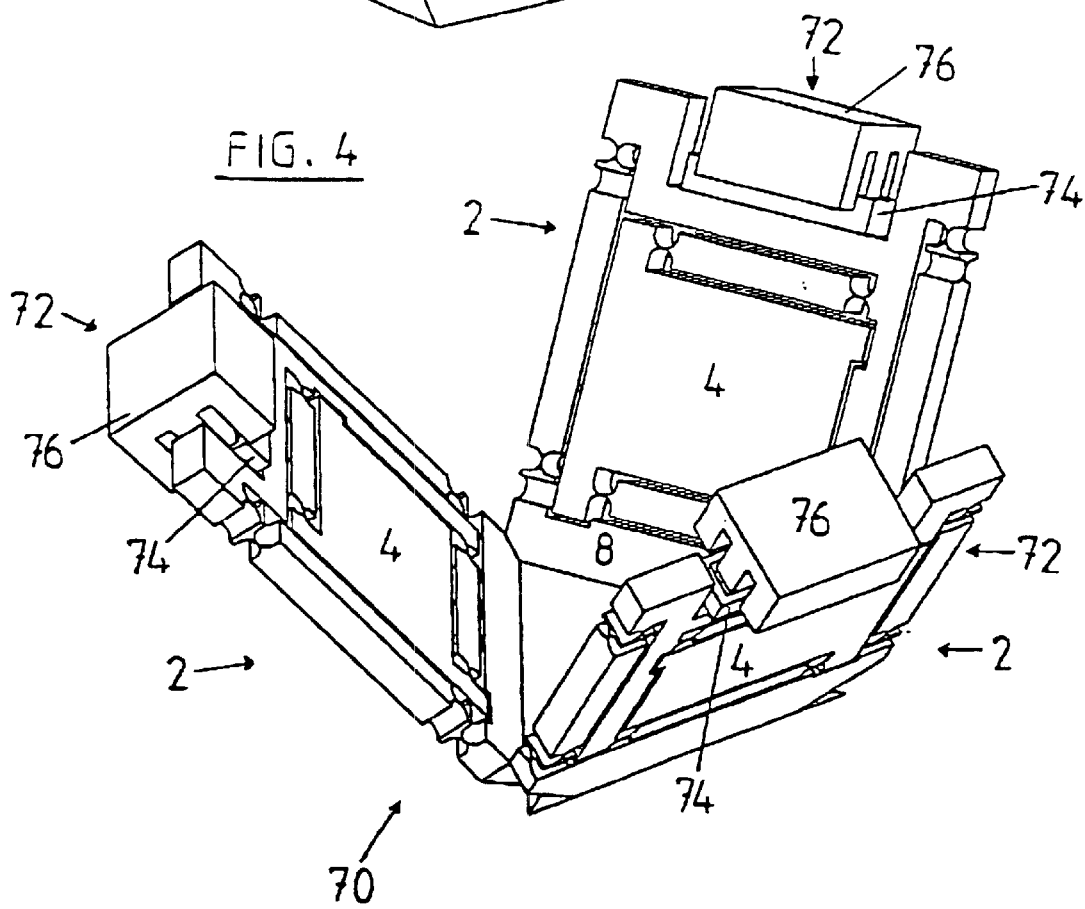
FIG. 4 is a perceptive view of a movement transmission apparatus assembled using three of the transmission units of FIG. 3 coupled together, and which, when so assembled form a first preferred embodiment of a positioning apparatus.

FIG. 2 shows a plan view of a transmission unit 2 assembled in accordance with the teachings of a second preferred embodiment of the invention (which transmission unit 2 is employed in a first movement transmission apparatus of FIG. 4) in which the double bend linkages 50, 52, 58 and 60, are made from two bend linkages 54 and 56. The bend linkages 54, 56 show an angle of about 60° to one another, as well as an angle of about 30° away from the plate plane of the transmission unit 2. This is particularly advantageous, if the transmission unit 2, by means of the wire spark erosion work has been made out of one piece of plate shaped material, (for instance, a titanium alloy). In the case of this mode of production, there can be on the plate surface, namely working remnants of the holding of the workpiece, i.e. by additional turning of the workpiece on the workbench, when the plate-like extension of the transmission unit 2 does not overstep the maximal allowable cross-sectional in this type of metal working.

Figure 2A:
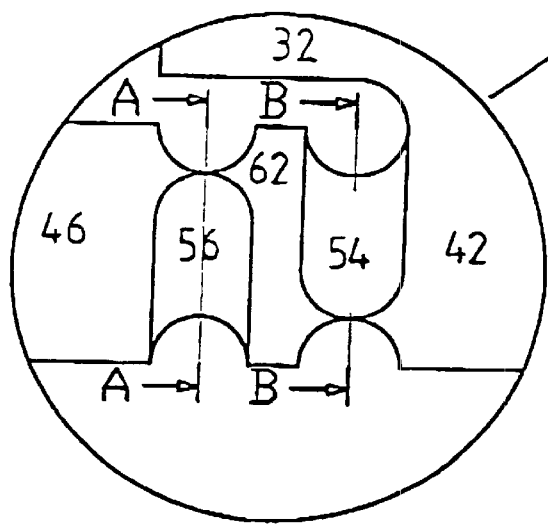
FIG. 2a is an enlarged fragmentary cross-sectional view taken along line A—A of FIG. 2c and illustrating one portion of the double bend linkage.
Figure 2A:
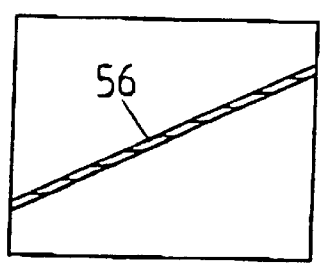
Figure 2B:
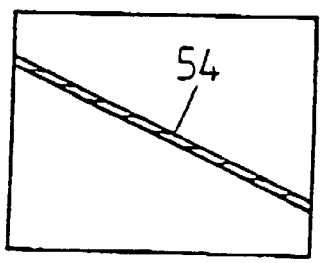
FIG. 2b is an enlarged fragmentary cross-sectional view taken along line B—B of FIG. 2c and illustrating another portion of the double bend linkage.

The double bend linkages 50, 52, 58 and 60 shown in FIG. 2, 2a, and 2b, now make possible a production method, without these problematic plate parallel cuts, since their bend linkage 56 rotates out of the plate plane. When this is done, then the output section 8 can still carry out the same swinging movements in relation to the second section 6. This is enabled in that the double bend linkages 50, 52, 58 and 60 are so dimensioned, that they allow, besides their normal swing movement, also a twist movement. This means, that the second bend linkage 56 can make a twist movement of the bar 46 relative to the load apportionment section 62, and the first bend linkage 54 can make a twist movement of the load apportionment section 62 in relation to the projections 42. The bar 46, in a swinging movement of the output section 8 from above to below or vice versa, that is, out of the drawing plane, can carry out a twist, or torsion movement, which, because the twist of the first and the second bend linkage 54 und 56 is a necessary adjunct of the forced coupling of the swinging movement.

Figure 3:
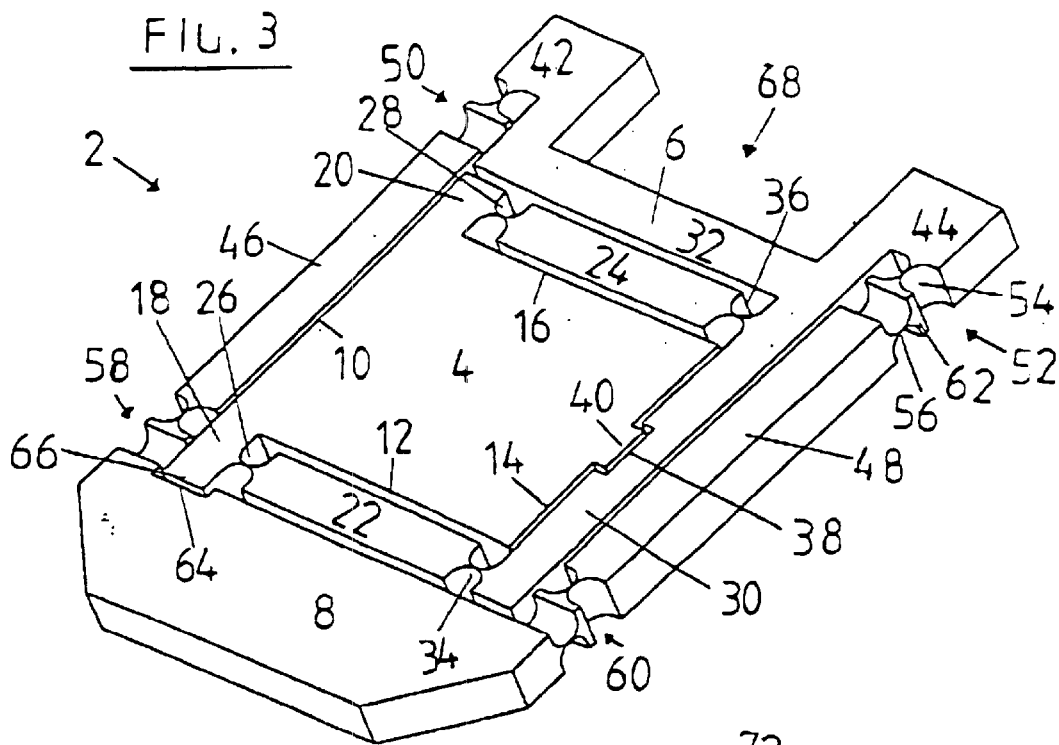
FIG. 3 is a perspective view of a transmission unit assembled in accordance with the teachings of a third embodiment of the present invention and illustrating additional mechanical blockages.

In the case of the perspective view presented in FIG. 3, a transmission unit 2 assembled in accordance with the teachings of a third preferred embodiment of the present invention is shown, which shows the limitation of the swinging range of the second section 6 in relation to the first section 4 by means of a recess 38. The recess 38 is provided in the side surface 14 of the first section 4. The recess 38 is engaged by a protuberance 40, which protruberance is located on the inside of the first leg section 30. The recess 38 and the protuberance 40 are, in this function, so dimensioned, that the first leg section 30, proceeding from its idle position respectively can carry out a defined maximal displacement to the left and/or right. This maximal displacement, can occur because of the maximum allowable bending angle of the bend linkages 26, 28, 34 and 36.

Further, in the output section 8 is provided an additional recess 64 for the acceptance of an elongation 66 of the projection 18 of the first section 4. The recess 64 and the elongation 66 operate similar to the protuberance 40 and the recess 38 to form a mechanical detent means, which limits the swinging movement of the output section 8, as shown in the FIG. 1 embodiment, in its movement from above to below. An additional, not shown mechanical blockage for the limitation of the swinging range out of the plane of the drawing can be provided, in that on the elongation 66 shown in FIG. 3, respectively, on the under and the upper sides a projecting collar is provided, which limits a swinging movement of the output section 8 out of the drawing plane.

In the third embodiment example (first movement transmission apparatus) shown in FIG. 3, for the purpose of weight reduction of the movable parts, the second leg section 32 of the second section 6 is designed with a large open end cutout 68. The second leg section 32 possesses now, the shape of a narrow bar with two offset projections 42, 44 on the said bar ends.

FIG. 4 depicts a perspective view of a first embodiment of an invented first movement transmission apparatus 70, which is composed of three transmission units 2 respectively coupled with one another by means of the output section 8 of each. These three transmission units 2, in the embodiment of a first movement transmission apparatus 70 shown in FIG. 4, are certainly not mounted orthogonal to one another because of their plate shaped extension, but because their arrangement makes possible a coupled movement of the output sections 8 which are bound to one another with three degrees of freedom of movement.

For a positioning of the output sections 8, which are coupled together, the second sections 6 of the three transmission units 2, are coupled respectively by their second leg section 32 with a drive means 72. The drive means 72 is designed as an electromechanical actuator, which, in relation to FIG. 6 will be described in greater detail. The drive means 72 are respectively so dimensioned along their drive direction, that they fit well into the cutout 68 of the second leg section 32. In this matter, the interior of the cutout 68, is rigidly bound with the movable, driven component 74 of the driving means 72, while the immovable, driving part 76 of the drive means 72 is rigidly affixed to the solid base in the work room (not shown in FIG. 3) of the first movement transmission apparatus 70. With this solid base, of the first movement transmission apparatus 70, respectively also the first sections 4 of the three transmission units 2 are rigidly affixed together.

Figure 6:
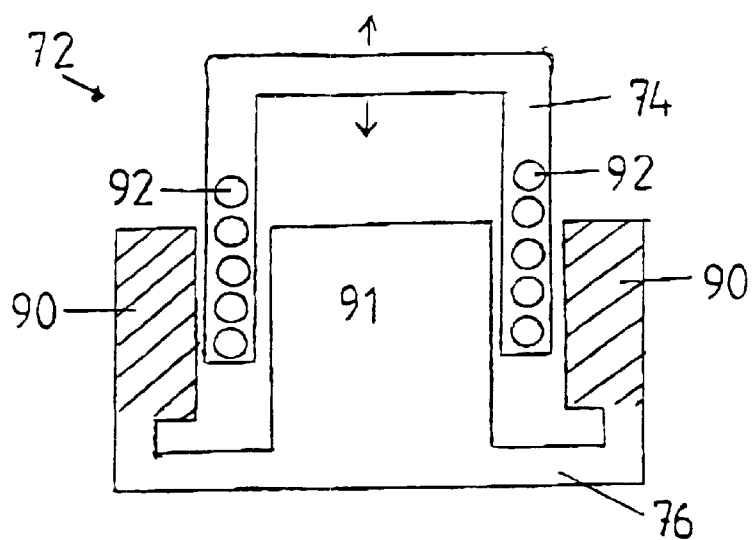
FIG. 6 is an enlarged cross-sectional view of a drive means assembled in accordance with the teachings of the present invention and which drives the transmission units of the positioning apparatus.

The shown driving means 72 advantageously allows a small movement of its driven component 74 orthogonal to its drive direction (when both parts 74 and 76 are correspondingly constructed—see FIG. 6). This is advantageous, since the section 6, by its movement in the drive direction always carries out an enforced coupled movement perpendicular to the drive direction. In the case of a drive means 72 constructed as a spindle drive, then the "solid" part, for instance, must be firmly bound to the base by means of a bend linkage, so that its spindle is not tilted.

Each transmission unit 2 carries out a driven movement of its output section 8 along the driving direction of its own driving means 72, wherein each transmission unit 2 form a rigid unit along this drive direction. This drive movement leads each transmission unit 2 by means of its first parallelogram swing linkage, this being comprised of the bend linkages 26, 28, 34 and 36. Perpendicular to this drive direction (or within an optional angle thereto) each transmission unit 2 allows a transitional movement in the drive direction of the two other transmission units, by means of its second parallelogram swing linkage, the latter consisting of the double bend linkages 50, 52, 58 and 60. The said transitional movement, may be more exactly described as a swing movement without rotation of the output section 8.

Because of the special arrangement shown in FIG. 4 of the transmission units 2, each transmission unit 2, when it is driven alone, the other two transmission units 2 not being driven, besides the "swing movement" of the first parallelogram-swinging linkage (along the drive direction), carries out an enforced coupled "swing movement" by means of the second parallelogram swing linkage (and indeed principally by means of the second bend linkage 56 of the second parallelogram swing linkage is the "swinging" accomplished). The first parallelogram swing linkage has, namely, also the above mentioned, enforced coupled translational cross movement, perpendicular to the driven translational movement. This enforced cross movement is picked up by a output section 8 which is non-yielding to the cross movement in this direction (the driving means 72 in the two other transmission units 2, place a block in the direction of this cross movement).

As becomes evident from the above arrangement of the single transmission units 2, these can be arranged at an optimal angle to one another. In doing this, one of these transmission units 2, even without a drive means 72, can serve as a stabilizing means for the movement of the common output section 8.

Figure 5:
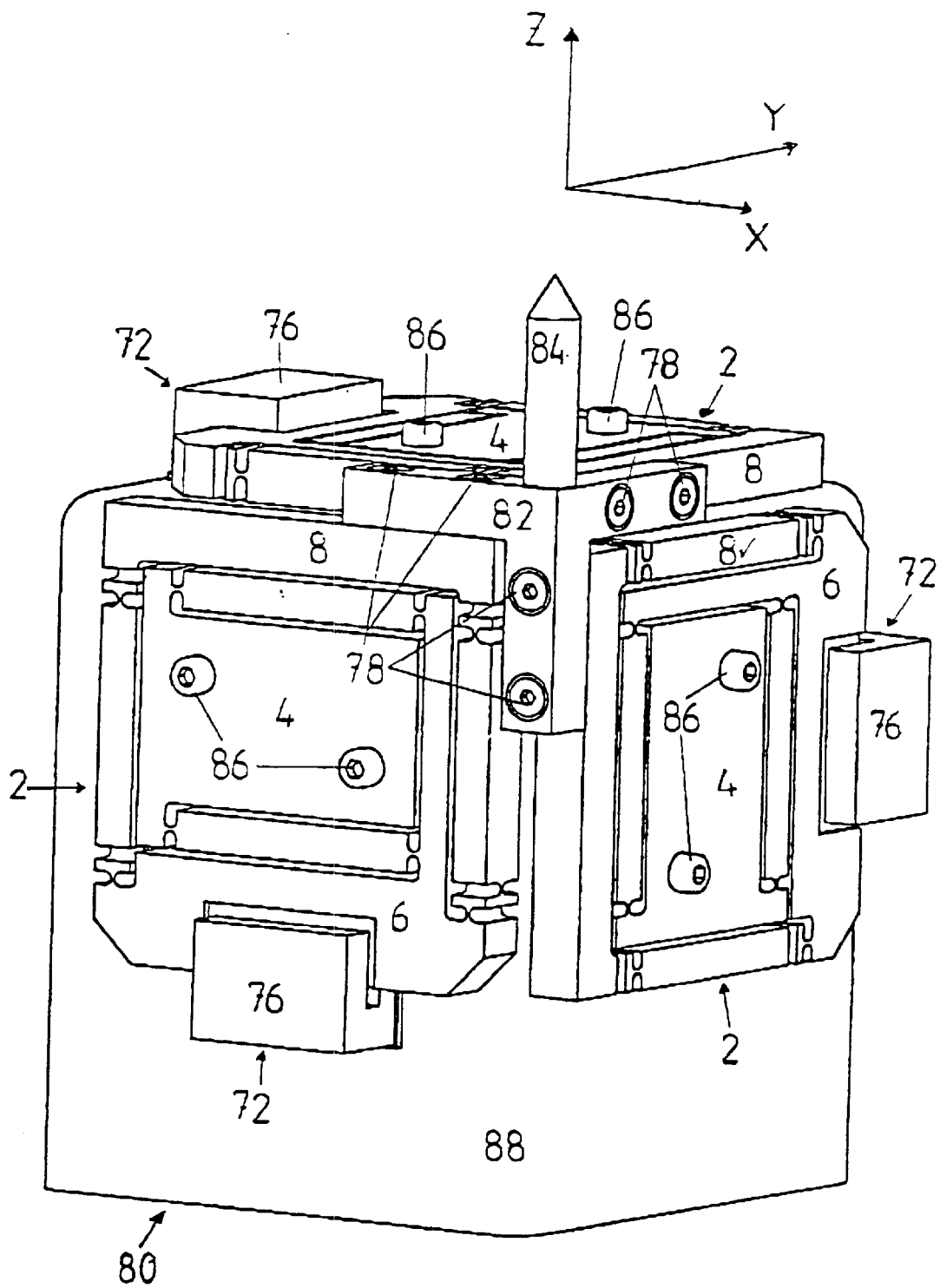
FIG. 5 is a perspective view of a positioning apparatus assembled in accordance with the teachings of a second embodiment of the invention and which is comprised of three coupled transmission units.

FIG. 5 shows a perspective view of a second embodiment of a positioning apparatus 80 with a first movement transmission apparatus 70, which is a combination of three transmission units 2 orthogonally aligned with one another. These three transmission units 2 are respectively rigidly affixed, one to the other by means of a solid angle member 82 joining their output sections 8 with fastening screws 78. The said solid angle member 82 also carries a positioning pointer 84. The transmission units 2, in turn, are solidly affixed in the workroom to a base 88 by means of fastening screws 86 which penetrate the first sections 4. The said rigid base 88 can, in this arrangement, take on the shape of a hollow block, in which, the required driving means 72 for the transmission units 2 are affixed, as well as the (not shown) control means and positioning measuring devices. The transmission units 2 are so placed in relation to the outer edges of the rigid base 88, that the individual "swing movements" are not interfered with by an object possibly standing in the paths thereof. The same applies for the fastening of the solid angle member 82 to the output sections 8.

By means of the drive of the transmission unit 2 shown in FIG. 5, located on the drawing to the right, i.e. on the negative ordinates of the y-axis, being superimposed on, for instance, the transmission unit 2 situated to the left in FIG. 5, through a corresponding "swing movement" of its output section 8, a movement component is induced in the negative Z-direction. (This movement component can be likewise evoked through the first parallelogram-swing movement of the left-lying, driven transmission unit 2). This movement component in the negative Z-direction can be compensated for by a corresponding drive in the FIG. 5 left situated transmission unit 2 in a positive Z-direction. The same applies for the drive of the positioning pointer 84 in the X and Z directions, in which a corresponding compensation movement of the two other transmission units 2 is required.

These compensating movements can be regulated by a (not shown) control means with an integrated correction algorithm. The correction algorithm can, for this purpose, store the individual forced couplings in the form of a 3×3 correction matrix, which is multiplied by the 3-D movement vector of the desired spatial movement of the positioning pointer 84. As a result, the current movement component to be driven by each transmission unit 2 is obtained. This 3×3 correction matrix can then, be determined either by a computer from the geometry of the entire arrangement, or by means of a maximum of nine measurements of the spatial disposition of the positioning pointer 84 in different positions of the three driving means 72 of the three transmission units 3.

The solid base 88, again, can be coupled with (not shown) large scale macro positioning, so that, as a whole, the pathway of the positioning pointer 84 is increased in scale. With appropriate design of the transmission units 2 and the positioning apparatus 80, the positioning pointer follows, namely, movements in the millimeter range, which is especially governed by the allowable swinging movements of the bend linkage (about +/−10°) and the length of the bars 22, 24, 46 and 48.

The solid base 88 can be so installed in the workroom, that upon the moving of the positioning pointer in the Z-direction, (which has been aligned in reference to the gravity axis), either only one transmission unit 2 (first alternative) is driven, or (second alternative) all three transmission units 2 must be simultaneously driven. The second alternative has the advantage, that the drive means 72 of all three transmission units 2 must be, capacity wise, built to be equally strong. In the case of the first alternative, for the movement of the positioning pointer 84 in the Z-direction, the transmission unit 2 must be designed either stronger in its capacity and/or it must be coupled with a functional, parallel acting spring means between the first section 4 and the second driven section 6. In this way, a preset tensioning against the force of gravity is produced. On the other hand, in the case of the second alternative, for a movement solely along the X and Y or the Z-axial directions, always, respectively, all three transmission units 2 must be driven. This does not present any problem under the current control means of today.

The driving means 72 can respectively be coupled with a (not shown) measurement apparatus, which can separately determine the relative position of the second section 6 in relation to the first section 4 of each transmission unit 2. With this feature, an exceptionally exact control of the positioning pointer 84 becomes possible. Further, with such a formulation, the positioning apparatus 80 can be designed as a joystick with force feedback. The joystick is, in this case, rigidly bound to the positioning pointer 84, so that a spatial movement of the joystick by the three (not shown) measurement devices can be determined and by the corresponding driving means 72, a force feedback to the joystick can occur.

The first and the second parallelogram swing linkage can be so constructed, that it, instead of a "swinging movement" carries out a rotational movement of respectively the first leg section 30 or the output section 8 about a respective point of reference. This can be carried out, in that the bars 22 and 24 (or 46 and 48) of the two parallelogram swinging linkage, are not parallel to one another, but are aligned somewhat trapezoidally to one another. With a corresponding positioning apparatus 80, thus, a rotation of the positioning pointer 84 about the X, or Y, or Z axis would be possible. Such a positioning apparatus could be functionally, serially coupled with the positioning apparatus 80 shown in FIG. 4, so that, a movement of the positioning pointer 64, independently, with six degrees of freedom of movement is possible (three movements of translation and three movements of rotation). Obviously, also any other combination on transmitter unit 2 is possible so that combined, a play space of from two to six degrees of freedom of movement is covered.

FIG. 6 shows a cross-section of a driving means 72, based on a design of electro magnetic actuator. The movable and driven component 74 of the driving means 72, exhibits, in its function, a box shaped pot-like shape, the outer base of which is rigidly bound to the second leg section 32 of the second section 6. The immobile, driving component 76 of the driving means 72, possesses an E-shape, the under and upper cross pieces of which are designed as permanent magnets.

As an alternative, a permanent magnet 90 in the area of this cross piece can be rigidly bound to the stationary component 76. The average cross piece 91 of the immobile component 76 protrudes upward into the opening of the pot shaped component 74 and essentially fills the cross-section of the same. Further, the wall thickness of the pot-like portion 74 is so dimensioned, that it essentially fills the free space between the stationary cross pieces. About the outer section of the pot shaped component 74 (for instance, incorporated in the outer wall) is a current carrying winding 92, which, upon flow of an electric current, induces a magnetic field within the pot shaped component 74 which is directed toward, or away from the said pot bottom. This magnetic field acts upon the pole shoe of the central core 91 formed by the two permanent magnets 90 of the immobile component 76. Dependent upon the applied strength of current, and the counter force of the driven, movable component 74, the relative position of the movable component 74 to the immobile component 76 becomes determined. The said counter force, in the shown positioning apparatus 80 of FIG. 5 is evoked by the individual bend linkages 26, 28, 34, 36, 50, 58 and 60, when these are swung out of their idle positions. Since the force on the movable component 74 is proportional to the applied current, a good control of the linear movement can be achieved. In coaction with a corresponding measurement instrument and an associated control loop between the measurement equipment and the driving means 72, a very close control of the linear movement can be carried out.

Figure 7:
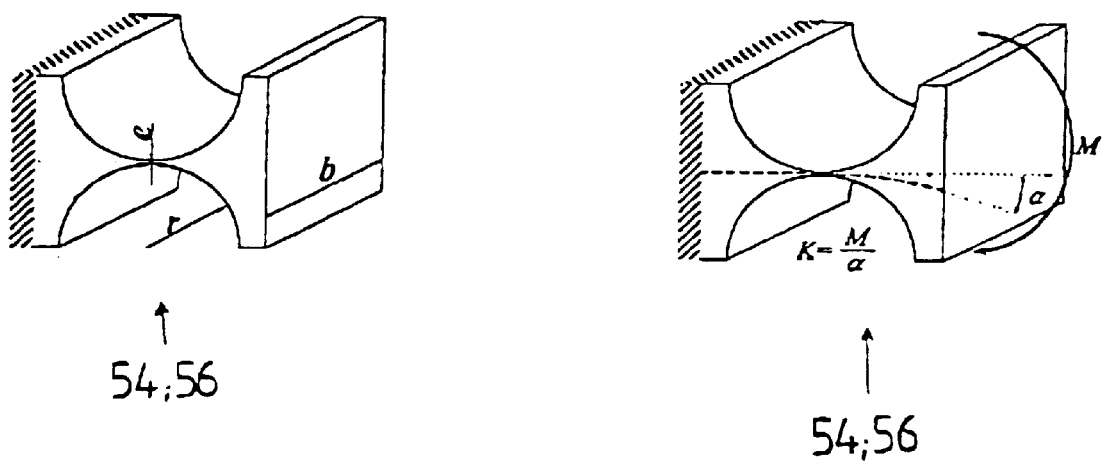
FIG. 7 includes two enlarged fragmentary views in perspective illustrating the circular bend linkage assemblies and showing different parameters of the bend linkage assemblies.

FIG. 7 depicts two perspective views of a special embodiment of notched bend linkages as installed in the invented movement transmission apparatus. In the illustrated embodiment of FIG. 7, the notching is circular in shape (all other kinds of notching are allowable). Additionally, in the two illustrative presentations of FIG. 7, respectively the various parameters are inscribed, which can be utilized in the description of the circular shaped bend linkages. A circular bend linkage can be looked upon as a bar with a varied cross-section.

In case a pure bending moment M acts upon the apex of this bend linkage, this then bends through an angle α. The angular rigidity of the bending element is defined as K=M/α. This angular rigidity K can be approximated by a simplified formula, which provides a very close approach to the true value of the actual angular rigidity:

$$K = \frac{2*E*b*e^{2.5}}{9*\pi*r^{0.5}}$$

wherein:
E=Young's modulus of elasticity,
b=the width of the bend linkage,
e=the thickness of the bend linkage at its thinnest section, and
r=the radius of the circular cutout.

Proceeding from this formula, further, an approximating formula for the maximum bending loading in the said bend linkage can be evolved as a function of the bending angle α:

$$\sigma = \frac{4*E*\sqrt{c}*\alpha}{3*\pi*\sqrt{r}}$$

This formula will make plain, that small radii of the circular bend linkage give a high bending loading, and conversely, large radii provide a low bending loading. This shows, that in the course of the miniaturization of the transmission unit 2, the single sections 4, 6 and 8 could be also bound together by simple circular shaped bend linkages of large radius (instead of additional parallelogram swing linkage construction by the bars 22, 24, 46 and 48), so that in the result, principally we have only one kinematic arrangement of bend linkages orthogonally connected with one another. The three sections 4, 6 and 8 of the transmission unit 2 are, on this account, required to be only so largely dimensioned, that they offer a means of load apportionment between the bend linkages which are serially coupled with one another, and further, the said sections are to offer a binding possibility with the drive means 72, that is, with the output 82 and 84, i.e. the fastening to a solid base 88.

For further details regarding the construction of the circular shaped bend linkages, especially in connection with their fabrication by an electro erosion process, refer to the publication "Fatigue Failure Of Thin Wire Electrodischarge Machined Flexible Hinges" by Simon Henein, Cedric Aymon, Stefano Bottinelli and Reymond Clavel, published in Procedures of SPIE Symposium on Intelligent Systems for Advanced Manufacturing, Boston, Mass., USA, Sep. 19–22, 1999.

Figure 8:
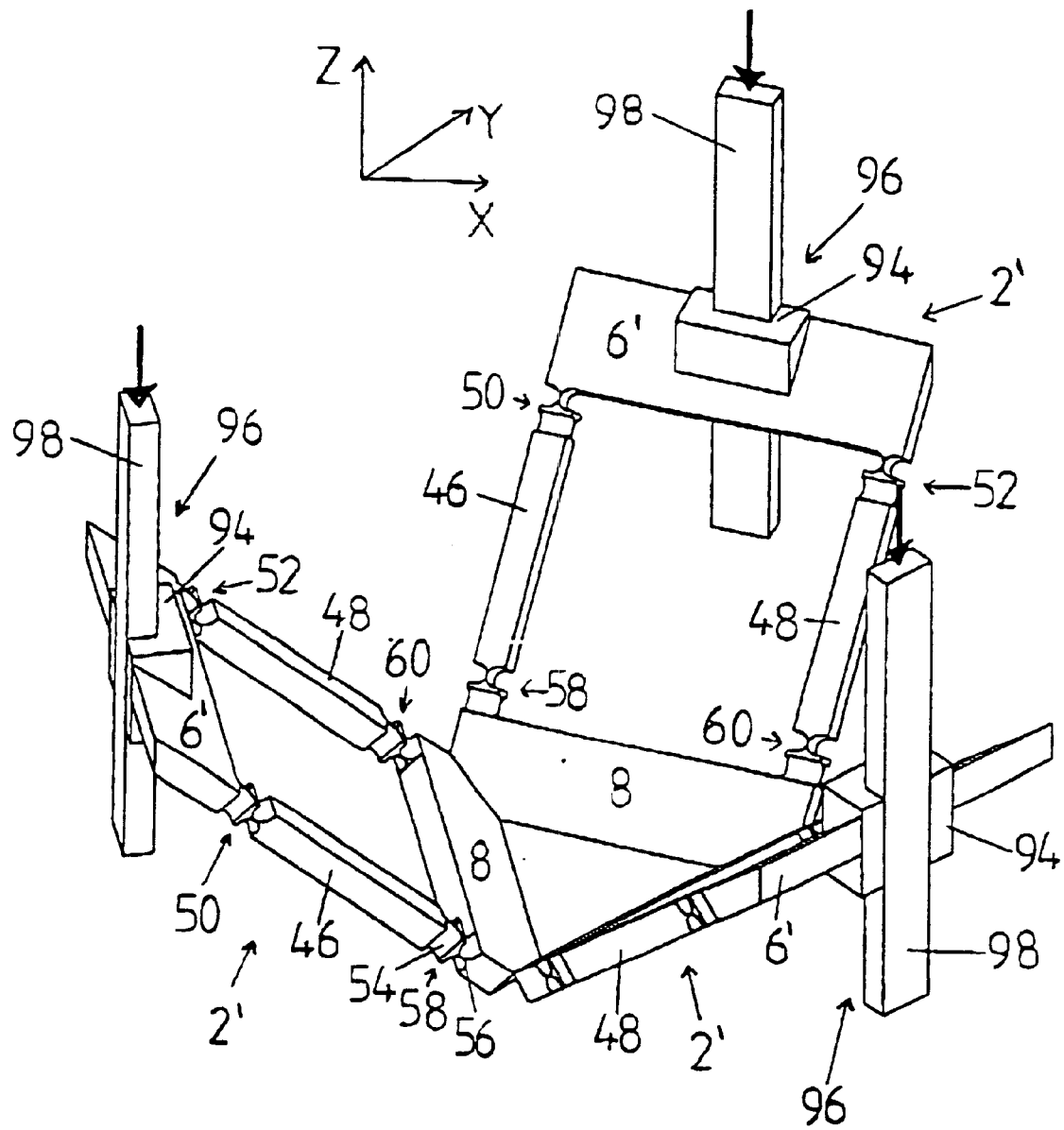
FIG. 8 is a perspective view of a positioning apparatus assembled in accordance with the teachings of third embodiment of the present invention which has been assembled using the transmission unit of the second embodiment.

FIG. 8 shows, in perspective view, an embodiment of a further positioning apparatus with a second movement transmission apparatus, which is comprised of three transmission units 2', similarly constructed to the transmission units 2 of the first movement transmission apparatus. The transmission units 2 and 2' essentially differ in that in the case of transmission unit 2', respectively, the first section 4, as well as parallelogram-bending linkage composed of bend linkages 26, 28, 34 and 36, along with the bars 22 and 24, between the first section 4 and the second section 6 are lacking. Further, the input-side second section 6' is constructed somewhat differently than before. As to the rest, the transmission unit 2 and 2' are, however, identically built, so that for a description thereof, reference is made to the above description.

On the second section 6' of that transmission unit 2' is a movable, driven part 94 of a drive means 96 so installed, that the second section 6' of each transmission unit 2' is driven at a specified angle in relation to the corresponding extension direction of the associated transmission unit 2'. In this case, a stationary driving part 98 of the drive means is constructed as a kind of travel rail, along which the movable part 94 is moved in the fashion of a kind of linear motor. In the embodiment shown in FIG. 8, the drive of the second (input) section 6' of all three transmission units 2' runs parallel to the Z-direction, which, in FIG. 8, is from above to below (this does not always have to be the case, for instance, all three immobile parts 98 can be placed at a specific angle to the Z-direction). Moreover, in the embodiment shown in FIG. 8, the second (input) sections of each transmission unit are placed at the same angle to the fixed part 98 of its corresponding drive means (alternatively, these can also be installed at different angles).

This angle, for this service, can lie between 90° and 180°, whereby the outside limiting values, i.e. 90° and 180°, are themselves excluded and such angles as approach these values are unfavorable, since in this range of angles, the pathways of the coupled output sections 8 vertical to the Z-direction, would be reduced to near zero. The optimal situation is shown in the configuration of FIG. 8, wherein the angle is 135°, at which value, besides the long pathway along the Z-direction, also maximum pathways are possible in the X and Y directions. The pathway in the Z-direction is, for instance, predetermined by the length of the solid part 98 (i.e.—the pathway of the linear motor).

The movement of the coupled output sections 8 in the X or Y directions, is done by different adjustments of the Z-coordinate of the three pieces 94 which move relative to their fixed rod-like component 98. Should, for instance, the left (as in the drawing) transmission unit run upwards from the position shown in FIG. 8, then the coupled output section 8 also runs upward in the Z-direction but also in the X-direction to the left. By appropriate counter control, the two transmission units to the right (again per the drawing) moving downward, can, for instance, can make only one movement of the coupled output section 8 in the X-direction to the left. Thus, an independent control of the coupled transmission units in all three spatial directions is possible.

The extended direction of the transmission units 2' run along the bar 46, 48 between the second section 6' and the output section 8 (in FIG. 8, in the case of the non-compensated position of the double bend linkages 50, 52, 58 and 60).

Further structural and operational features of the disclosed embodiment(s) will now be discussed. With the disclosed design(s), the movement superimposed by pulse to the input section (the 2nd section) is precisely transmitted to the output. The principal advantage in the use of bend linkages in contrast to sliding joints or rollers as swinging connections, is the absence of friction, wear, mechanical play and the general imperviousness to collecting interfering contamination. Further, a high degree of mechanical rigidity can be achieved, dependent upon the chosen general build up of a transmission unit. Such a structure is extremely important, especially for precision movements. With such a movement transmission apparatus, in the positioning of the output section, one can achieve, for instance, a positioning of 0.01 μm within a total travel range of something like +/−1 mm per dimension.

By means of a bend linkage, that kind of an elastic linkage should be understood as it is used in special arrangements of different elastic materials (see more below). Such a bend linkage, can, in its service, carry through various different types of movement, for instance, a swinging movement, a torsion movement or an axial movement, (compression vs tension). For a general illustration of special bend linkages, reference is made to the descriptions with the aid of the drawings given in the last part of this disclosure, the publication of which is taken cognizance of in this present description.

In accordance with one or more of the preferred embodiments, the movement transmission apparatus may be constructed so that it transmits two entry side movement components (for instance, two translated input movements along the X and the Y axes) into an output movement of the movement transmission apparatus with at least two coupled degrees of freedom of movement, for instance, in the X and Y directions. In doing this, it is not absolutely required that translated movements once again must be converted into translated movements. Besides this, optional combinations of rotation and translation movements (the swinging movement here is considered a combination of rotation and translation movement) can be reformed into an exit movement, which, likewise exhibits different kinds of freedom of movement, that is, any combination of rotation and translation movement.

Beyond this, the reforming of the movement need not be in a 1:1 ratio, that is, the number of the input-side degrees of freedom of movement do not necessarily have to be the same number of the output-side degrees of freedom of movement. This should be valid principally for the most simple case of two input-side degrees of freedom of movement, which are converted into an output-side movement with two coupled degrees of freedom of movement, not one degree of freedom for pure translation or rotational movement. The input section of a transmission unit can, for instance, in accord with its degree of freedom of movement, be forced along a complicated spatial path.

The transmission of movement can, likewise, can be effected in a direction from the output-side of the movement transmission apparatus to the respective input section of the transmission unit, which is especially advantageous for the subsequently described measurement device.

Among the individual sections of a transmission unit, by a corresponding miniaturization of the movement transmission apparatus only such transmission sections be understood, which couple the two bend linkage means with one another. By appropriate design of these two bend linkages, the borders between the linkage means and the individual section merge into one another. In this lies exactly the advantage of the disclosed embodiment, since in the case of a design of the coupling means wherein they appear as bend linkages, such a miniaturization becomes very easy.

However, care must be taken in the dimensioning of material thicknesses, in order that the individual bend linkages are properly constructed.

Advantageously, the movement transmission apparatus encompasses three transmission units for the transmission movement components received on three input sections, with, respectively, one degree of freedom of translation movement in one output-side movement with three degrees of freedom of translational movement. In this case, a movement transmission apparatus has been created which is simple to control, as seen from the geometric point of view, and which enables the spatial movement of its output in three dimensions. The three degrees of freedom for the input-side movements, must, in this case, not be arranged orthogonally to one another.

For additional increase of the precision, the individual transmission units are preferably constructed of one piece. In other words, principally all sections, including the bend flexures of a transmission apparatus are made out of one piece. Dependent upon the various demands as to precision, single transmission units of a movement transmission apparatus can be single piece or multipiece in construction.

Advantageously, the first bend linkage means and/or the second linkage means can each be made in the shape of a parallelogram element, wherein the parallelogram swing linkage encompasses a bar pair with respectively one bend linkage at all four bar ends, and the two ends respectively of one bar, by means of the corresponding bend linkage, are respectively coupled with the first (see FIG. 4), the second section, that is to say, coupled to the output. With this special formulation of the bend linkage means, the rigidity of the transmission unit is further increased, and along with this the precision of the entire movement transmission apparatus is improved.

Advantageously, one or all linkages are made with indentations in the material, especially indentations of circular geometry. In the case of the various notching shapes, the so constructed linkage can be optimized in regard to the notch effectiveness as a high amplitude of flexibility can be attained and material fatigue avoided. Large notching on the rim of the linkage is, naturally, avoided. Circular notching proves itself as advantageous by imparting a high degree of flexibility, which, in the outer layers of the bend linkage, depresses the tendencies to tension stresses. Given an appropriate thickness of the bend linkage, for example, circular indentations at the thinnest parts and by the use of materials with a high modulus of elasticity, a maximal deflection can be achieved up to +/−10°. Furthermore, with these bend linkages, no concentration of loadings can occur on the ends of the linkages. At this point the bend linkages can have a higher compressional rigidity and a lower fissuring or breakage risk.

Advantageous are the second bend linkage means, which are constructed as double bend linkages. In this case, one double bend linkage encompasses two single bend linkages which are functionally bound together by a load apportionment means. This arrangement allows a swinging movement, respectively, in various directions, Such a double bend linkage would be advantageously installed in a movement transmission apparatus. The movement transmission apparatus would include, at least three transmission units. This is the equivalent of three input-side movements with respectively different degrees of freedom of movement, and which are to be transmitted to one corresponding output movement. The double bend linkages here, characterize themselves by their simple buildup, which permits one swing action with two different degrees of freedom of movement.

For easier fabrication of a single piece designed transmission unit, these are usually built in plate form.

Advantageously, in each transmission unit, a mechanical block is provided, which limits the movement zone of the second section in respect to that of the first section. The block may also limit the second section in regard to the output section along the associated degree of freedom of movement in both directions. Advantageously, these mechanical blockages prevent the single bend linkage elements from being stressed beyond their maximum allowable bend limit.

Preferably, the individual transmission units are made by means of a spark erosion process, especially a wire spark erosion method. This special manufacturing procedure has proven itself exceptionally advantageous in the making of the single bend linkage.

In particular, in the case of cutting a transmission unit out of one piece, the ratio of the width of the gap to the depth of same is extremely small. As a consequence, the cutting of the gap, has to be of the highest precision, which leads to a better protection of the mentioned indentations (bend linkage) with an ongoing lessening notch action.

Advantageously, the two bend linkages of the double bend linkage are designed to be aligned at a specified angle to one another, and each of the two bend linkages is turned at an angle to the plate surface of the associated transmission unit. This is exceptionally of advantage in connection with the fabrication of the bend linkage. In the case of such machining, it is possible that principally sections up to a maximal cross-section thickness can be carried out. In this matter, in the case of greater surfaced, plate shaped transmission units, it becomes difficult to carry out cutting parallel to the plate surface. The principle is, that bend linkages, which carry out a swinging operation perpendicular to the plate surface, can only be produced by this process with great difficulty. Advantageously in this embodiment, now the bend linkages are so turned at an angle relative to the plate surface, that no cut parallel to the plate surface need be made.

At this point, for the retention of the desired swinging movements of the output section, i.e. vertical to the plate surface, it is of advantage, if the double bend linkages were advantageously so dimensioned, that they permit, besides the swinging action, also a torsion movement. Such a minimal torsion movement occurs, namely, exactly by the above mentioned twisting of the two bend linkages in regard to the plate surface, if these, for instance, should be turned to be perpendicular to the plate surface.

An advantageous state is to have the weight of the movable parts of a transmission unit minimized, so that the dynamic behavior of the same, in turn can be optimized. For this purpose, a geometric optimization may be carried out (for instance, by means of a finite element computation) and the choice of suitable materials included therein. As a whole, by this procedure, no increase in cost worth considering would be incurred, but the dynamic characteristics of said behavior would be substantially improved.

Preference is given to the fabrication of the movement transmission apparatus from:

a titanium alloy, steel stainless steel aluminum an aluminum alloy a titanium-nickel alloy copper a copper alloy a ceramic, or a plastic material.

The titanium alloy or the ceramics find favor because of their light weight and rigidity, which contributes to the dynamic behavior and precision of the movement transmission apparatus. Plastic raw material allows the production of low cost units (particularly in large numerical quantities, when injection molding is employed). Copper and its alloys assure a high degree of elasticity and bend thresholds. Further, copper and its alloys, like other metals and alloys, are especially well thought of in regard to their electrical conductivity which facilitates electro erosive processing for shaping.

The disclosed embodiment, in addition to the above, creates also a positioning apparatus, which includes in its structure a movement transmission apparatus. In this arrangement, each transmission unit is coupled with a driving means for the activation of its input section to move in the direction of the associated degree of freedom of movement.

In a preferential way, the said driving means is an electromagnetic actuator or another electromotor-like precision drive for the producing of a linear movement, this being coupled with a positioning means. This special means of drive, characterizes itself especially by its simple buildup and its high precision. Non-contact driving means, such as Voice-Coil-Actuators, have particularly demonstrated themselves as favorable. For further details in regard to this Voice Coil Actuator, reference should be made to specific publications on the subject, the disclosure of which is hereby incorporated into the present description.

The positioning apparatus is advantageously conceived as a fine-positioning apparatus and/or, by means of the first section of each transmission unit is functionally and serially coupled with a macropositioning device. Thanks to this coupling, advantageously great processing areas with a high positioning resolution become available. Now the possibility is open, for instance, for the very exact determination of a given spatial position by means of measuring devices suitable therefor, and subsequently, by means of the fine-positioning apparatus to make corrections thereto with micrometer precision.

The said driving means are advantageously regulated by a controller equipped with correction algorithms. These correction algorithms are so formulated, that in a case of the driving of the output of the movement transmission apparatus along a specific direction, compensation is provided to said driving means for such translation movement as may have been called up by the forced coupling action of the bend linkages. This is true for one or more driving means, or one or more such bend linkages. In a preferred type of movement of the bend linkage, i.e., the swinging movement, principally, a rotation of the linked parts occurs. This is valid also for the preferred parallelogram-swing linkage, with which the rotation is indeed subdued. Further, however, the said bend linkage compels a movement component which is orthogonal to the main input movement component. Dependent upon the geometry of the linked parts, there is always a movement of said parts in two directions transverse to one another. One of these two "undesirable" movement components can now be compensated, by means of a corresponding movement of one or more other transmission units. These said other transmission units carry out a drive movement, which at least has a component which counters the said "undesirable" movement.

The positioning apparatus is advantageously mounted in the operating space, so that in the case of an output-side movement of the movement transmission apparatus solely along the Z-axis, which is aligned along the gravity direction, all driving means are essentially equally under load. This advantageous state can be achieved, in that, with three transmission units, all three driving directions of these transmission units run at the same angle to the Z-direction.

Advantageously, when this is done, all driving means are designed to be of equal strength and capacity, that is, no driving means must possess a higher level of load along the direction of gravity axis.

In an alternative, but also preferred embodiment, the positioning apparatus is so erected in the work space, that by so doing, principally, the "one driving means" is loaded. This driving means is to be along the gravity axis. Preferably, the said directed movement is resisted by a means provided counter to gravity. This compensating action can preferably be a spring, functionally coupled in parallel and/or the said one driving means being, in capacity, stronger than the other driving means.

In accord with a further embodiment example, a measurement device has been made, which incorporates a movement transmission apparatus, whereby the input of the said measurement device is the output of the said movement transmission apparatus. In this alignment, the input section of each transmission unit is coupled with corresponding measurement devices, which enable a position measurement along the associated degree of freedom of movement of the corresponding input section. Advantageously, with this arrangement, an especially, very precise measurement of volume of the general magnitude of some $mm^3$ can be carried out. This measuring device can, for instance, be advantageously installed as the measuring head for a coordinated measurement machine.

The disclosed embodiment further concerns the use of such a positioning apparatus or measurement device in the area of processing workpieces. Among these areas can be mentioned: spark erosion treatment, electrochemical processing, semiconductor fabrication, the manufacture of optical-electrical connection components, the fabrication of Microsystems, robotics, dynamometers and/or joy-stick with power feedback. Further applications can be found, for instance, in medicine during operations, in the chemical industry, in meter and instrument servicing, and the like. Generally, every technological field can draw advantages from the present disclosure, wherein fine i.e. micro adjustments are necessary, for instance, tool working, especially micro erosions, mask adjustments in semiconductor manufacture, adjustment in contact manufacture (bonding) of chips and the like.

The input sections of the transmission units are advantageously so constructed, that the current input-side movements are introduced parallel to one another. In this way, the difference in the travel paths of the individual movement components is once again reinforced.

The transmission units of the second movement transmission apparatus advantageously (see the above mentioned preferred embodiment) in this way, can be constructed similarly to the transmission units of the first movement transmission apparatus, with the single exception, that here, their first section as well as the bend linkage of the second section by means of corresponding first bend linkages are lacking.

The disclosed embodiment creates further a position apparatus with the invented second movement transmission apparatus, in which each transmission unit is coupled by means of its input section with a drive means for the driving of this input section along the corresponding input-side degree of freedom of movement. The driving means are, preferably, constructed together with the attendant input sections according to the type of linear motor.

It will be understood that the above description does not limit the invention to the above-given details. It is contemplated that various modifications and substitutions can be made without departing from the spirit and scope of the following claims.

What is claimed is:

1. A movement transmission apparatus for the transmission of at least two input-side (6) movement components with respectively one degree of freedom of movement in an output-side (82, 84) movement with at least two degrees of freedom of movement, or vice versa, comprising a plurality of transmission units (2), each of the transmission units (2) corresponding to an input side (6) degree of freedom of movement, whereby the transmission units (2) ,whereby these transmission units (2), by means of their respective output sections (8) are coupled with one another in a functional and parallel manner, each transmission unit (2) includes a stationarily fixed first section (4) and as input section, a second section (6) which is connected thereto by a first linkage means (22, 26, 34; 24, 28, 36), which section (6) is movable linked in the direction of the corresponding degree of freedom of movement of the transmission unit (2), whereby, the second section (6) is so constructed, that it, by means of a second linkage means (46, 50, 58; 48, 52, 60) is permitted free travel along the degree of freedom of movement of the other transmission units (2), therein characterized, in that the first (22, 26, 34; 24, 28, 36) and the second (46, 50, 58; 48, 52, 60) linkage means are constructed as bend linkages and that the second section 6, the second linkage means (50; 52; 58; 60) and the output section (8) are so constructed, that they, together, form a rigid structure along the input-side degree of freedom of movement of the associated transmission unit (2).

2. The movement transmission apparatus according to claim 1, further comprising three transmission units (2) for the transmission of three input-side (6) movement components with respectively one translational degree of freedom of movement to one output-side (82, 84) movement with three translational degrees of freedom of movement.

3. The movement transmission apparatus according to claim 2, wherein the second linkage mean, (50; 52; 58; 60) is constructed as double bend linkage, wherein the double bend linkage incorporates a first and second bend linkage (54, 56) each of which is serially and functionally bound to the other a first and second by means of a load apportioning means (62), thus enabling a swinging movement in various directions.

4. The movement transmission apparatus according to claim 3, wherein the double bend linkages (50; 52; 58; 60) are so dimensioned, that they allow besides the swinging movement, also a twisting movement.

5. The movement transmission apparatus according to claim 1, in which each of the individual transmission units (2) are constructed of one piece.

6. The movement transmission apparatus according to claim 1, wherein at least one of the first linkage means (22, 26, 34; 24, 28, 36) and the second linkage means (46, 50, 58; 48, 52, 60) are constructed in parallelogram swing linkage, whereby the parallelogram swing linkage encompasses one pair of bars (22, 24; 46, 48) with respectively one bend linkage (26, 28, 34, 36; 50, 52, 58, 60) on all four bar ends and the two ends respectively of a bar (22; 24; 46; 48) are coupled with the first (4) and the second (6) sections by means of the corresponding bend linkages (26, 28, 34, 36; 50, 52, 58, 60).

7. The movement transmission apparatus according to claim 6, wherein the first section (4) and/or the output section (8) of a transmission unit (2) are designed in bar or plate shapes, and incorporate the second section (6), a first and a second leg section (30, 32), which, in a specified angle are especially disposed at right angles to one another, a first side surface (10) of the first section (4) is coupled with the first leg section (30) of the second section (6) by means of a second parallelogram swing linkage (22, 26, 34, 24, 28, 36), and the second leg section (32) of the second section (6) by means of a second parallelogram swing linkage (46, 50, 58, 52, 48, 60) is so coupled with the output section (8), that the first (22, 26, 34, 24, 28, 36), and the second (46, 50, 58, 52, 48, 60) parallelogram-swing linkage are aligned with one another at a defined angle, especially being orthogonal to one another.

8. The movement transmission apparatus according to claim 7, in which the bar pair (22, 24) of the first parallelogram-swing linkage (22, 26, 34, 24, 28, 36) encompass two oppositely disposed side surfaces (12, 16) of the first section (4) and the bar pair (46, 48) of the second parallelogram swing linkage (46, 50, 58, 52, 48, 60) enclose the other oppositely situated side surface (10, 14) of the first section (4) and encompass also the first leg section (30) of the second section (6).

9. The movement transmission apparatus according to claim 1, wherein at least one of the bend linkages (26, 28, 34, 36;, 50, 52, 58, 60) are constructed in particular as material notches, especially with a circular shaped geometry.

10. The movement transmission apparatus according to claim 1, wherein the transmission units (2) are designed in a plate-like shape.

11. The movement transmission apparatus according to claim 10, wherein the two bend linkages (54, 56) of the double bend linkage (50; 52; 58; 60) are aligned at a defined angle to one another and each of the two bend linkages (54, 56) is set at a defined angle relative to the plate surface of the associated transmission unit (2).

12. The movement transmission apparatus according to claim 1, wherein in each transmission unit (2) includes a mechanical detent (38, 40; 64, 66) which limits the movement range of the second section (6) in relation to the first section (4) and/or the second section (6) in relation to the output section (8), said limitation being along the associated degree of freedom of movement in both directions.

13. The movement transmission apparatus according to claim 1, wherein the individual transmission unit (2), are machined by means of a spark erosion process, especially a wire-spark erosion process.

14. The movement transmission apparatus according to claim 1, wherein the weight of the movable parts (6; 8; 22; 24; 28; 34; 36; 46; 48; 50; 52; 58; 60) of a transmission unit (2) is minimized in accord with the said weight.

15. The movement transmission apparatus according to claim 1, wherein the transmission unit is manufactured from a material selected from the group consisting of: a titanium alloy, a titanium-nickel alloy, steel, steel alloy, stainless steel, aluminum, aluminum alloy, copper, copper alloy, ceramic, or plastic.

16. The positioning apparatus according to claim 1, wherein each transmission unit (2) by means of its input section (6) is coupled with a driving means (72) for the activation of this input section (6) in the direction of the associated degree of freedom of movement.

17. The positioning apparatus according to claim 16, in which the driving means (72) is an electromagnetic actuator, a piezoelectric actuator or another electromotor-like precision drive for the production of a linear movement, especially coupled with a position measurement means.

18. The positioning apparatus according to claim 16, wherein is constructed as a fine-positioning apparatus and/or, by means of the first section (4) each transmission unit (2) is functionally, serially coupled with a macropositioning apparatus.

19. The positioning apparatus according to claim 16, wherein the driving means (72) is regulated by a control means with correction algorithms, whereby the correction algorithms are formulated so that, during driving of the output (82, 84) the movement transmission apparatus is compensated along a specified direction, by means of the forced coupling of the bend linkages (26; 28; 34; 36; 50; 52; 58; 60), which evoke translational movements by corresponding drives of one or several of the other driving means (72).

20. The positioning apparatus according to claim 16, in which the apparatus is aligned in a work room, that during a output-side (82, 84) movement of the movement transmission apparatus solely along the Z-direction, which is aligned in the gravity direction, all driving means (72) are essentially equally under load.

21. The positioning apparatus according to claim 16, wherein the positioning apparatus is so installed in workroom, that by an output-side (82, 84) movement, of the movement transmission apparatus solely along the Z-direction, which is in the gravity direction, essentially one driving means (72) is under load.

22. The positioning apparatus according to claim 21, wherein the driving means (72), in the case of movement along the Z-direction, is functionally and serially coupled in parallel with a prestressed, passive means, especially a spring means, and/or is, in respect to power and capacity, built stronger than the other driving means.

23. The application of a positioning apparatus or a measuring device in accord with one of claim 16 in the fields of: work piece machining, spark-erosion machining, electro-chemical material working, the making of semi-conductors, the manufacture of optical-electronic connection construction elements, micro-system, the robotics, usage as power meter, and/or joystick with power feedback.

24. A measurement device for the measurement of a movement in space with a movement transmitting apparatus in accord with one of the claim 1 to 15, the input of which device is the output section (6) of each transmission unit (2) is coupled with corresponding measurement means, which enable a measurement of position along the associated degree of freedom of the corresponding input section.

25. A movement transmission apparatus for the transmission of three entry side movement components with respectively one degree of freedom of movement into an output-side movement with three degrees of freedom of movement, or vice versa, which comprises three transmission units (2') with respectively one input section (6) and one output section (8), which, by means of their output sections (8) are coupled with one another in a functional, serial and parallel way, each transmission unit (2') embraces an extension direction from its respective input section (6') to its respective output section (8) and includes linkages constructed as bend linkages (50, 52, 58, 60) of such a kind, that its respective output section (8) allows free movement perpendicular to its extension direction, whereby the input section (6') of the transmission unit (2') is so designed, that the respective input-side movement is introduced into an angle to the extension direction, therein characterized, in that the bend linkages (50, 52, 58, 60) are designed according to a parallelogram swing linkage, whereby each parallelogram swing linkage includes a bar pair (46, 48) with respectively one bend linkage (50, 52, 58, 60) on all four bar ends and the two ends, respectively of one bar, (46; 48) by means of the corresponding bend linkages (50, 52, 58, 60) respectively are coupled with the input section (6') and the output section (8).

26. The movement transmission apparatus according to claim 25, wherein which the input section (6') of the transmission unit (2) is so constructed, that the respective input-side movements are introduced parallel to one another.

27. The movement transmission apparatus according to claim 25, in which the transmission units (2) are constructed in accord with the features of the subordinate claims 5, 6, 7, 11, 12, 13, 14 or 15.

28. The positioning apparatus with a movement transmission apparatus according to claim 25, in which each transmission unit (2') by means of its input section (6) is coupled with driving means (96) for the driving of its input section (9') along the associated input-side degree of freedom of movement.

29. The positioning apparatus according to claim 28, wherein the driving means (96) together with the associated input sections (6') are designed in the style of linear motors.

* * * * *